H. E. COBLE.
VEHICLE SPRING.
APPLICATION FILED SEPT. 18, 1916.

1,230,673.

Patented June 19, 1917.
2 SHEETS—SHEET 1.

Witnesses:
Robert H. Weir
Arthur U. Carlson

Inventor.
Harvey E. Coble.
by Foree Bain & Hurry
Attys.

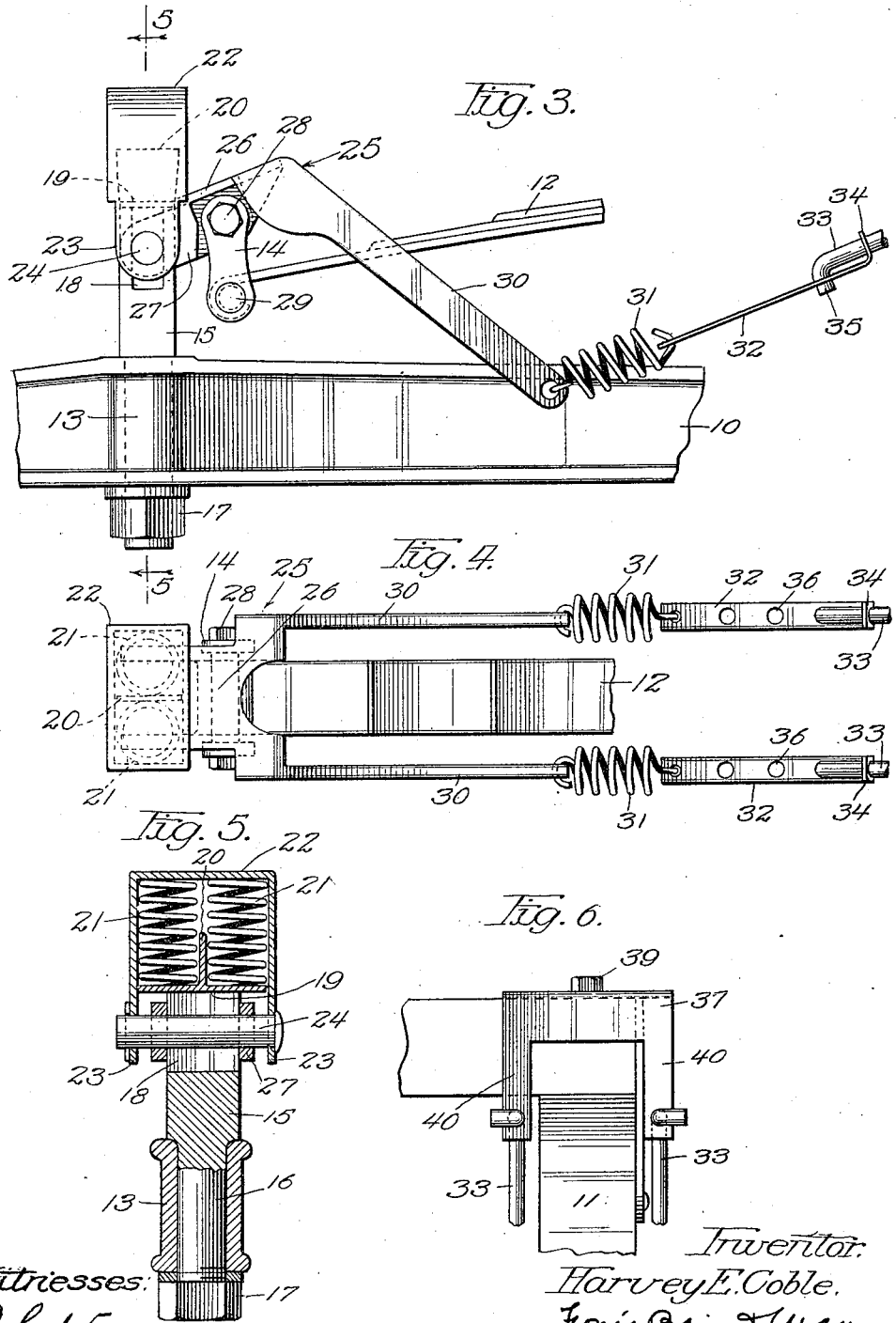

UNITED STATES PATENT OFFICE.

HARVEY E. COBLE, OF BENTON HARBOR, MICHIGAN.

VEHICLE-SPRING.

1,230,673.  Specification of Letters Patent.  Patented June 19, 1917.

Application filed September 18, 1916. Serial No. 120,867.

*To all whom it may concern:*

Be it known that I, HARVEY E. COBLE, a citizen of the United States, residing at Benton Harbor, in the county of Berrien and State of Michigan, have invented certain new and useful Improvements in Vehicle-Springs, of which the following is a specification.

My invention relates to improvements in vehicle spring suspension apparatus and more particularly to an auxiliary spring support for coöperation with the transverse leaf springs, such as are employed on certain types of automobiles.

One of the objects of my invention is to provide an auxiliary spring mechanism for association with the regular springs commonly furnished by the manufacturer and by means of which the riding qualities of the vehicle will be greatly improved by absorption of the small, minor vibrations to which the leaf springs would not respond and also by the cushioning of hard jolts and jars to which the leaf springs respond but cannot absorb.

Another object of my invention is to provide such an apparatus which will be inexpensive and easy to apply without the necessity of boring or drilling any of the iron parts of the car, the application of the springs to a car being readily accomplished by any one capable of using a monkey wrench and screw driver.

Still another object of my invention is the provision of such an apparatus particularly adapted for association with the spring suspension of a Ford automobile, its construction being sturdy, efficient and not liable to derangement.

Still other and further objects will become readily apparent to those skilled in the art from a consideration of the following description and drawing, wherein:—

Fig. 3 is an enlarged detail front elevation illustrating the interposition of my spring hanger between the end of the transverse leaf spring and the axle.

Fig. 4 is a plan view of the apparatus shown in Fig. 3.

Fig. 5 is a vertical transverse sectional view on the line 5—5 of Fig. 3, and;

Fig. 6 is a fragmentary side elevation illustrating the connection between one of the spring suspension rods and the front end of the Ford frame.

Figure 1:
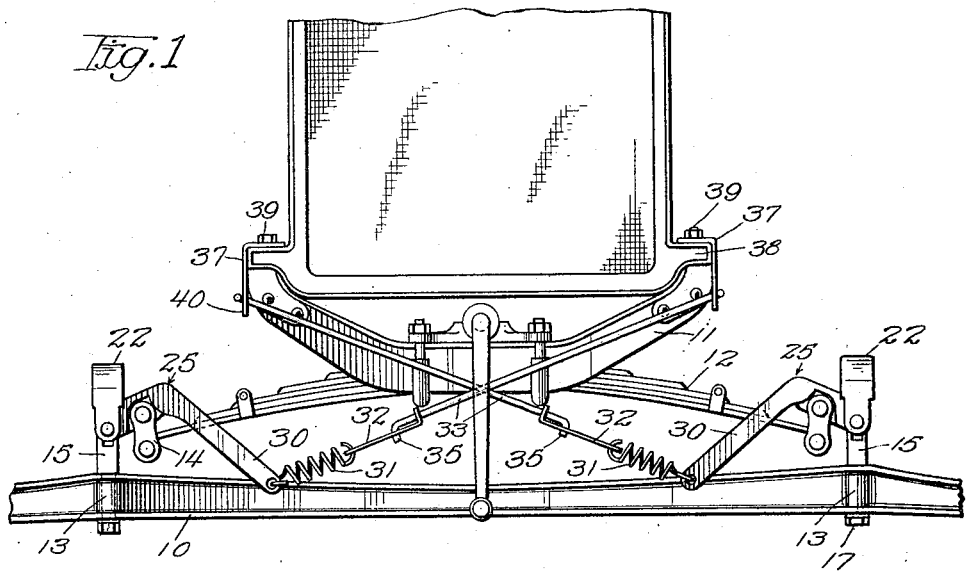
Figure 1 is a front elevation of a portion of a Ford automobile showing the transverse leaf spring and my improved suspension attached thereto.

In the drawings wherein I have illustrated a preferred embodiment of my invention, the numeral 10 indicates the front axle of a Ford, 11 the front transverse frame member and 12 the transverse leaf spring with which such cars are equipped.

The Ford axle near each end is thickened at 13 and provided with a vertical opening to receive hanger bolts to which the ends of the flat leaf springs 12 are connected by links 14. In applying my apparatus to a Ford I remove the standard spring hangers that are furnished with the car and substitute therefor a vertical hanger 15 having a bolt portion 16 extending through the opening in the enlarged portion 13 of the axle, the nut 17 being screw threaded on its lower end to clamp the hanger in position. The upper end of my improved hanger is provided with a longitudinally extending vertically elongated slot 18, above which is positioned a platform 19 with a transversely extending central partition or fin 20, dividing the surface of the platform 19 into two walls, on each of which rests the lower end of a coil spring 21. Overlying the platform 19 and the coil springs 21 and completely inclosing the same is a cup shaped cage or casing 22, having a pair of downwardly extending ears 23, perforated to receive the longitudinally extending pin 24, which projects through the slot 18 in the spring hanger, its top wall forming an upper abutment for the coil springs 21.

The connection between the pin 24 and leaf spring 12 is accomplished by means of an L-shaped bracket, indicated in general by the numeral 25, the short leg 26 of the L having its end bifurcated to form a pair of ears 27, overlying the sides of the hangers 15 and perforated for pivotal mounting on the pin 24. The short leg 26 of the L shaped bracket is also provided with an opening intermediate its ends to receive the bolt 28 which also passes through the upper end of the spring hanging links 14. A pin 29 joins the eye formed in the extreme end of the leaf spring 12 with the lower ends of the links 14.

The long leg of the L-shaped bracket 25 is bifurcated to form a pair of arms 30 which straddle the leaf spring 12 and axle 10. The end of each arm 30 is perforated for engagement with an end of each of the two coil springs 31, the opposite ends of which are hooked into perforations in the adjustment links 32 which in turn are adjustably connected with the rods 33 which extend upwardly to opposite sides of the vehicle frame.

Adjustment of the tension of the springs 31 is obtained through the peculiar formation of the adjustment plate 32, the upper end of which is bent at a right angle 34 and perforated to receive the rod 33, the lower end of which is bent downwardly at right angles, as at 35 to form a hook for engagement with any one of a number of adjustment holes 36 formed in the plate.

The upper ends of the adjustment rods 33 are hooked into perforations in the lower ends of plate 37, the upper portions of which are bent inwardly to rest upon the radiator flange 38 to which it is secured by means of the radiator fastening bolt 39. The lower end of the plate 37 is bifurcated, to provide a pair of downwardly extending arms 40 which lie at each side of the fender bracket. The perforations above referred to, for engagement by the rods 33 are formed in the lower ends of the arms 40.

Figure 2:
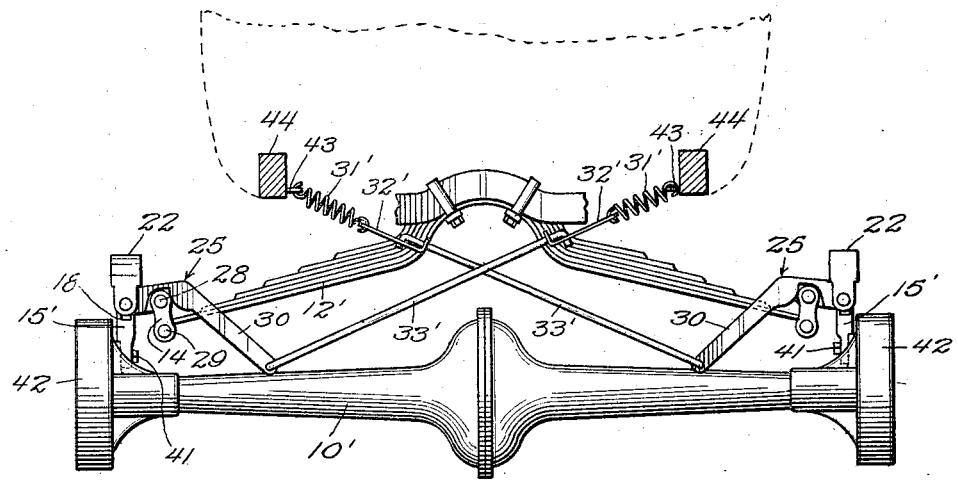
Fig. 2 is a similar view of the rear portion of a Ford automobile.

Thus far the apparatus has been described as particularly adapted for association with the front end of the car, but on referring to Fig. 2, it will be evident that practically the same parts may be utilized for accomplishing the same results on the rear of the car. The spring inclosing casing 22, L-shaped bracket 25, links 14, pins 28 and 29, together with rods 33', coil springs 31' and adjustment plate 32' are substantially identical with the previously described parts, but in this instance being arranged for association with the transverse rear leaf spring 12' and tubular axle housing 10'.

The rear spring hangers supplied with the car are bolted, by means of the studs 41, to the inner faces of the brake drums 42. In order to apply my improved spring suspension the usual spring hangers are removed and in their place the spring hangers 15' are attached by means of the bolts 41. The upper end of the spring hanger 15' is formed with a longitudinally extending slot 18 and platform together with the inclosed springs 21 as in the heretofore described parts carried on the upper end of the bolt 16 for attachment to the front axle. In the mounting of the apparatus upon the rear axle I find it somewhat more convenient to place the tension rods 33' in engagement with the perforated ends of the arms 30 and connect the coil springs 31' directly by means of screw eyes 43 to the wooden frame sills 44 under the rear portion of the automobile body.

From the above it will be obvious that I have first provided a pair of comparatively heavy shock absorbing coil springs 21 over each of the spring hanger bolts, these springs functioning similarly to the commonly known type of shock absorbers which are well known in the art. In addition to this shock absorbing spring I have provided the somewhat lighter coil springs 31 which are so tensioned as to normally carry the weight of the body with a light load so that these springs will take all minor vibrations caused by inequalities in the rod, without communicating them to the body of the car, through the intermediary of the heavier flat springs 12—12'. The car, therefore, sort of "floats" upon the springs 31, 31' until a heavy shock is encountered or the car is heavily loaded when these springs are extended to approximately their limits and the vertical movement of the axles are cushioned by the leaf springs 12—12' supplemented by the coil springs 21. Another particular feature of importance is the extending of the spring connections from one side at the bottom to the opposite side for connection with the frame of the car, the tension rods from each side crossing near the center of the car and thus very materially eliminating side sway or rocking of the body on heavy and uneven roads.

Whereas I have illustrated and described a single embodiment of my invention, it will be obvious that many changes may be made therein without departing from the spirit of the invention or the scope of the appended claims.

Having described my invention, what I claim is:—

1. A spring suspension for vehicles comprising the combination with a transverse leaf spring, of a hanger mounted on an axle, an arm positioned with one end pivotally connected with said hanger, links connecting an end of the leaf spring with the arm intermediate its ends, a coil spring connected at one end with the other end of the arm, and means connecting the other end of the coil spring with the opposite side of the vehicle frame.

2. A spring suspension for vehicles comprising the combination with a transverse leaf spring, of a hanger mounted on an axle, an arm positioned with one end pivotally connected with said hanger, links connecting an end of the leaf spring with the arm intermediate its ends, a coil spring connected at one end with the outer end of the arm, and longitudinally adjustable means connecting the other end of the coil spring with the opposite side of the vehicle frame.

3. A spring suspension for vehicles comprising the combination with a transverse leaf spring, of a hanger projecting upwardly from the axle, an arm pivotally connected at its outer end to the hanger, links connecting an end of the leaf spring to the arm adjacent its outer end, the inner end of the arm being bifurcated to straddle the leaf spring, and a coil spring connected to each of the bifurcated ends of the arm and to the opposite side of the vehicle body.

4. A spring suspension for vehicles comprising the combination with a transverse leaf spring, of a hanger mounted on an axle, an arm positioned with its outer end pivotally connected with said hanger, links connecting an end of the leaf spring with the arm intermediate its ends, a coil spring connected at one end with the inner end of the arm, and means for securing the other end of the spring to the opposite side of the vehicle frame comprising a rod and plate, said plate having a series of perforations and an upturned perforated end portion through which the rod passes, the end of the rod being hook-shaped for engagement with any one of said perforations.

5. A spring suspension for vehicles comprising the combination with a pair of relatively movable members, of a leaf spring carried by one member, a hanger carried by the other member, an arm slidably connected at one end with the hanger, a coil spring interposed between the hanger and said arm, links pivotally connecting an end of the leaf spring with the arm intermediate its ends, and a coil spring connected at one end to the free end of the arm and at its other end to the leaf spring carrying member.

6. A spring suspension for vehicles comprising the combination with a pair of relatively movable members, of a leaf spring carried by one member, a hanger carried by the other member, an arm slidably connected at one end with the hanger, a relatively heavy coil spring interposed between the hanger and arm, links connecting an end of the leaf spring with the arm intermediate its ends, and a relatively light coil spring connected at one end to the free end of the arm and at its other end to the leaf spring carrying member.

7. A spring suspension for vehicles comprising the combination with a transverse leaf spring, of a hanger projecting upwardly from the axle, a plate carried by the upper end of said hanger, a coil spring carried by said plate, a cover having its upper end closed encompassing said spring and extending downwardly at each side of the hanger, said hanger having a vertical elongated slot extending therethrough, an arm having its outer end perforated, a pin extending through said perforation and the downwardly extending portion of the spring cover slidable within the slot in the hanger, links connecting an end of the leaf spring with the arm adjacent its connection with the hanger and a coil spring connected at one end to the inner free end of the arm and at its other end to the vehicle frame.

8. A spring suspension for vehicles comprising the combination with a transverse leaf spring, of a hanger projecting upwardly from the axle, a plate carried by the upper end of said hanger, a coil spring carried by said plate, a cover having its upper end closed encompassing said spring and extending downwardly at each side of the hanger, said hanger having a vertical elongated slot extending therethrough, an arm having its outer end perforated, a pin extending through said perforation and the downwardly extending portion of the spring cover, slidable within the slot in the hanger, links connecting an end of the leaf spring with the arm intermediate its end, the inner end of the arm being bifurcated to straddle the leaf spring, a pair of relatively light coil springs, one of which is connected to each of the bifurcated ends of the arm and to the opposite side of the vehicle frame.

9. The combination with a vehicle shock absorber tension spring, of a spring adjusting device comprising a plate member and a rod member, one of which is connected to the spring, said plate having a series of perforations and an upturned perforated end portion, said rod extending through the perforation in the end of the plate, and a hooked end formed on the rod for engagement with any one of the perforations in the plate.

In testimony whereof I hereunto set my hand in the presence of two subscribing witnesses.

HARVEY E. COBLE.

In the presence of—
 MILO D. LONG,
 FLOY L. KING.

Copies of this patent may be obtained for five cents each, by addressing the "Commissioner of Patents, Washington, D. C."